(12) United States Patent
Ichiryu

(10) Patent No.: US 10,239,361 B2
(45) Date of Patent: Mar. 26, 2019

(54) MOTORCYCLE TIRE FOR TRAVELING ON ROUGH TERRAIN AND TIRE VULCANIZATION MOLD

(71) Applicant: SUMITOMO RUBBER INDUSTRIES, LTD., Kobe-shi, Hyogo (JP)

(72) Inventor: Yutaka Ichiryu, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 196 days.

(21) Appl. No.: 15/039,286

(22) PCT Filed: Dec. 5, 2014

(86) PCT No.: PCT/JP2014/082310
§ 371 (c)(1),
(2) Date: May 25, 2016

(87) PCT Pub. No.: WO2015/093325
PCT Pub. Date: Jun. 25, 2015

(65) Prior Publication Data
US 2017/0021676 A1 Jan. 26, 2017

(30) Foreign Application Priority Data
Dec. 16, 2013 (JP) .................................. 2013-259424

(51) Int. Cl.
*B60C 11/11* (2006.01)
*B60C 11/117* (2006.01)
(Continued)

(52) U.S. Cl.
CPC .......... *B60C 11/1376* (2013.01); *B29C 33/10* (2013.01); *B29D 30/0606* (2013.01);
(Continued)

(58) Field of Classification Search
CPC .... B29D 2030/0617; B29D 2030/0612; B29D 30/0606; B29C 33/10; B60C 2200/10; B60C 2200/14; B60C 11/032
See application file for complete search history.

(56) References Cited

U.S. PATENT DOCUMENTS 6,506,661 B1   1/2003   Chang et al.
D626,498 S  *  11/2010  Rossignaud ................ D12/536
(Continued)

FOREIGN PATENT DOCUMENTS

CN   101837713 A  *  9/2010
JP   09076234 A   *  3/1997
(Continued)

OTHER PUBLICATIONS

Machine Translation: JP-2008105581-A; Nakamura, Kazumi; (Year: 2018).*

(Continued)

*Primary Examiner* — Kendra Ly
(74) *Attorney, Agent, or Firm* — Birch, Stewart, Kolasch & Birch, LLP

(57) ABSTRACT

To provide a motorized two-wheeled vehicle tire for traveling on uneven terrain, the block durability performance of which has been improved; and a tire vulcanization mold capable of molding said tire. A motorized two-wheeled vehicle tire for traveling on uneven terrain wherein multiple blocks are provided on the tread at intervals in the tire circumference direction. Recesses are provided on the bottom surfaces of the grooves. Multiple recesses are provided at intervals in the axial direction of the tire. Spew, which was drawn up into the vent holes of the mold during vulcanization molding, or removal marks thereof are provided between each recess and the block that is adjacent in the tire circumference direction.

13 Claims, 5 Drawing Sheets

(51) Int. Cl.
  *B29D 30/06* (2006.01)
  *B60C 11/13* (2006.01)
  *B29C 33/10* (2006.01)
  *B60C 11/03* (2006.01)

(52) U.S. Cl.
  CPC ............ *B60C 11/032* (2013.01); *B60C 11/11* (2013.01); *B60C 11/1353* (2013.01); *B29D 2030/0612* (2013.01); *B29D 2030/0617* (2013.01); *B60C 2011/1361* (2013.01); *B60C 2200/10* (2013.01); *B60C 2200/14* (2013.01)

(56) References Cited

U.S. PATENT DOCUMENTS

2008/0110542 A1   5/2008   Sueishi
2010/0236678 A1   9/2010   Sueishi

FOREIGN PATENT DOCUMENTS

| JP | 2001-055012 A | 2/2001 |
| JP | 2006-88585 A | 4/2006 |
| JP | 2008-120269 A | 5/2008 |
| JP | 2008105581 A * | 5/2008 |
| JP | 2009-067245 A | 4/2009 |
| JP | 5-104911 B2 | 12/2012 |
| KR | 2002-0003020 A | 1/2002 |

OTHER PUBLICATIONS

Machine Translation: JP-09076234-A; Takahashi, Hidenori; (Year: 2018).*
Machine Translation: CN-101837713-A; Debing Yang; (Year: 2018).*
International Search Report issued in PCT/JP2014/082310 dated Mar. 3, 2015.
Written Opinion of the International Searching Authority issued in PCT/JP2014/082310 dated Mar. 3, 2015.
Extended European Search Report, dated Jul. 26, 2017, for European Application No. 14872238.2.

* cited by examiner

MOTORCYCLE TIRE FOR TRAVELING ON ROUGH TERRAIN AND TIRE VULCANIZATION MOLD

TECHNICAL FIELD

The present invention relates to a motorcycle tire for traveling on rough terrain that is improved in durability performance of blocks provided on a tread portion and a tire vulcanization mold capable of molding the tire.

BACKGROUND ART

Motorcycle tires for traveling on rough terrain used in motocross races and others have a plurality of large blocks sparsely formed on tread portions. These tires obtain a grip from the blocks biting into the road surface. Accordingly, there is demand for improvement in durability performance of the blocks.

The motorcycle tire for traveling on rough terrain described in Patent Document 1 includes a recess portion formed by recessing locally the groove bottom surface of the tread portion between adjacent blocks in a tire circumferential direction. The recess portion can reduce the concentration of stress on the basal portions of blocks to improve durability performance of the blocks.

CITATION LIST

Patent Literature

Patent Literature 1: Japanese Unexamined Patent Application Publication No. 2009-67245

Unfortunately, such a tire is not sufficient in improvement of the durability performance of the blocks and is requested for further enhancement.

SUMMARY OF INVENTION

Technical Problem

The present invention has been made in light of the foregoing circumstances. A major object of the present invention is to provide a motorcycle tire for traveling on rough terrain that improves durability performance of the blocks basically by forming a plurality of recess portions on a groove bottom surface and forming spews or their excision marks between one of recess portions and one of the blocks, and provide a tire vulcanization mold capable of molding the tire.

Solution to Problem

The present invention provides a motorcycle tire for traveling on rough terrain, the tire including a tread portion being provided with a plurality of blocks protruding radially outwardly from a groove bottom surface and arranged in a circumferential direction of the tire with a space therebetween, a plurality of recess portions being provided on the groove bottom surface between a pair of circumferentially adjacent blocks, the recess portions arranged in an axial direction of the tire with a space therebetween, and a spew sucked up a vent hole in a mold during vulcanization molding or its excision mark being provided between each recess portion and the block adjacent to the recess portion in the circumferential direction of the tire.

In another aspect of the invention, the recess portions are configured as a vertically long shape having a length in the circumferential direction of the tire greater than a length in the axial direction of the tire.

In another aspect of the invention, six to ten recess portions are arranged in the axial direction of the tire.

In another aspect of the invention provides a tire vulcanization mold including a tread molding surface for molding a tread portion of a motorcycle tire for traveling on rough terrain including a plurality of blocks protruding radially outwardly from a groove bottom surface and arranged in a circumferential direction of the tire with a space therebetween, the mold including the tread molding surface comprising a first portion for molding the groove bottom surface, a plurality of second portions for molding the blocks, and a plurality of projecting third portions provided between a pair of adjacent second portions in the circumferential direction of the tire for molding the recess portions on the groove bottom surface, the third portions being arranged in an axial direction of the tire with a space therebetween, and the first portion between one of the second portions and one of the third portions being provided with one end of a vent hole having the other end communicating with the outside of the mold to discharge an air to an outside of the mold during vulcanization.

In another aspect of the invention, the third portions are configured as a vertically long shape having a length in the circumferential direction of the tire greater than a length in the axial direction of the tire.

In another aspect of the invention, a hole diameter of the vent hole is in a range of from 0.5 to 1.5 mm.

In another aspect of the invention, six to ten third portions are provided in the axial direction of the tire.

In another aspect of the invention, a circumferential distance between an edge of the end of the vent hole and a circumferential end edge of the third portion is in a range of from 1 to 6 mm.

Advantageous Effects of Invention

The motorcycle tire for traveling on rough terrain of the present invention includes the recess portions on the groove bottom surface between a pair of adjacent blocks in the circumferential direction of the tire. The recess portions are arranged in the axial direction of the tire with a space therebetween. The recess portions do not decrease excessively the rigidity of the groove bottom surface between blocks adjacent in the circumferential direction of the tire but can moderate it evenly as compared to the case where only one large recess portion is provided. This alleviates effectively the concentration of stress on the basal portions of blocks.

In addition, the spew sucked up by the vent hole in the mold during vulcanization molding or its excision mark is provided between one of the recess portions and the block adjacent to the recess portion in the circumferential direction of the tire. The tire suppresses a residual gas likely to occur between blocks and recess portions when the recess portions and the blocks are vulcanized and molded on the tread portion. Accordingly, it is possible to suppress the molding failure of the basal portions of the blocks and generation of cracks causing the deterioration of durability performance of the blocks.

Therefore, the motorcycle tire for traveling on rough terrain of the present invention improves durability performance of the blocks.

REFERENCE SIGNS LIST

1 Tire
2 Tread portion
9d Groove bottom surface
10 Block
15 Recess portion
17 Excision mark
30 Tire vulcanization mold

DESCRIPTION OF EMBODIMENTS

An embodiment of the present invention will be described below.

Figure 1:
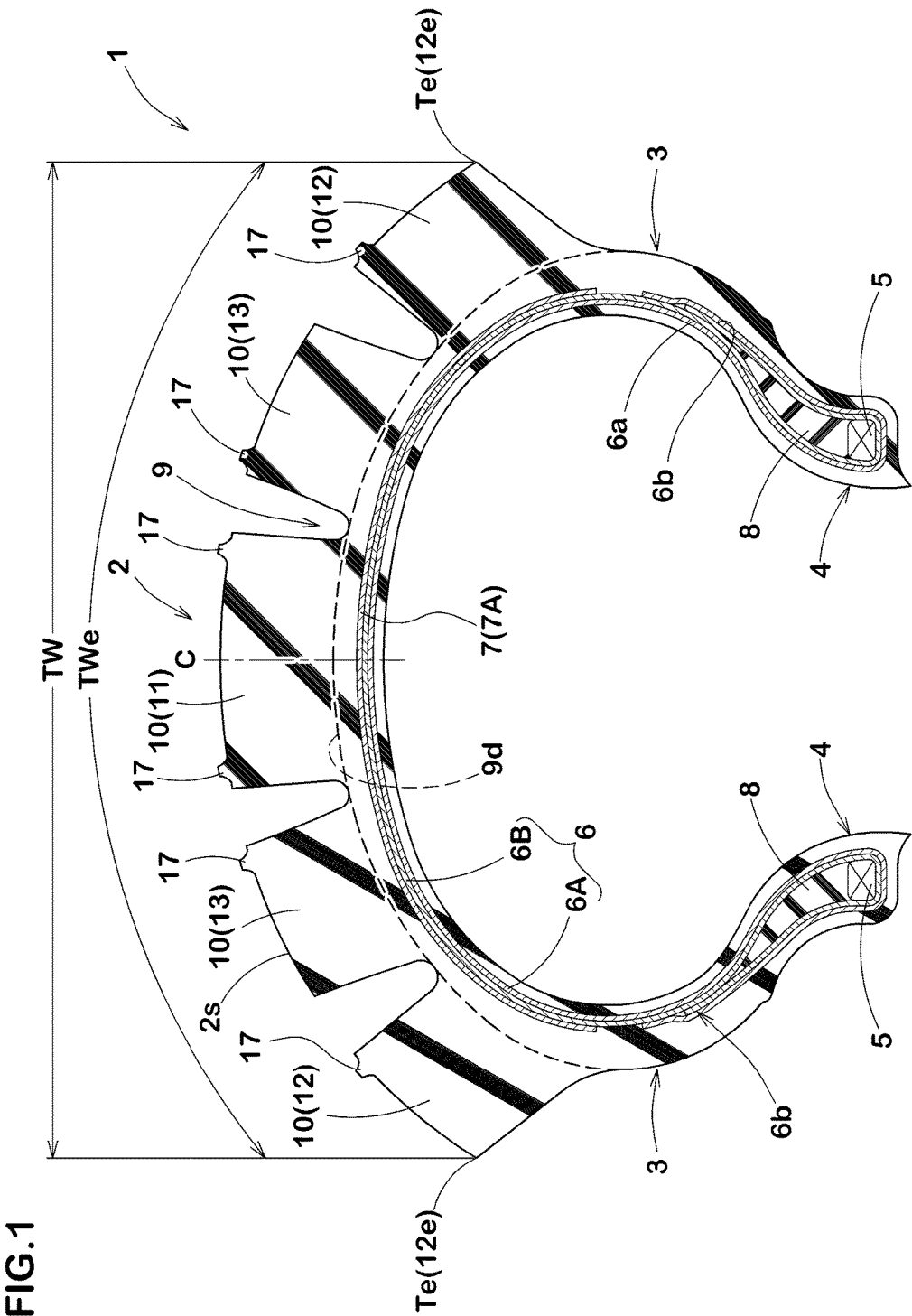
FIG. 1 is a cross-sectional view of an embodiment of a motorcycle tire for traveling on rough terrain of the present invention.
Figure 2:
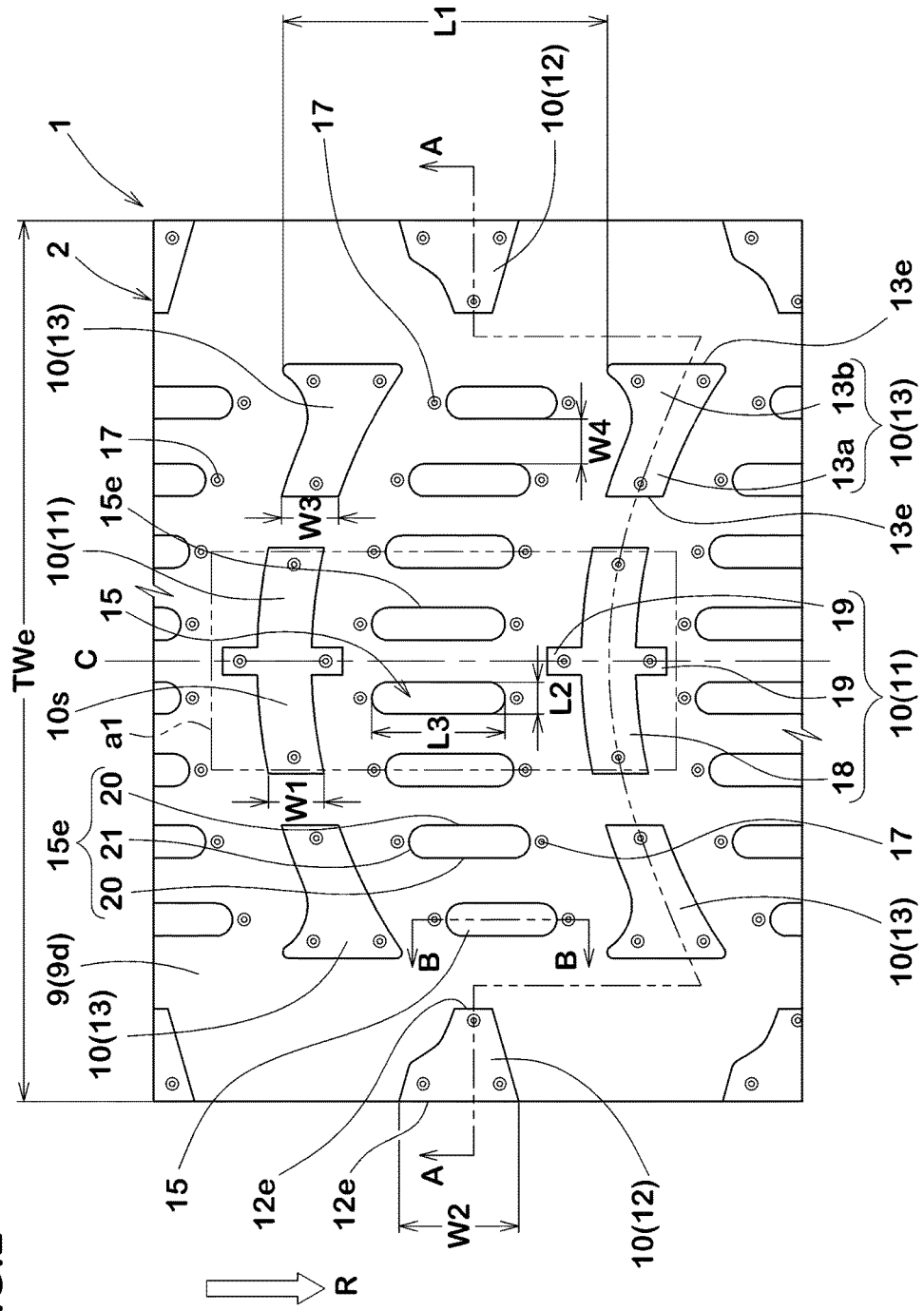
FIG. 2 is a development view of a tread portion illustrated in FIG. 1.

FIGS. 1 and 2 illustrate a tire for motocross races as a motorcycle tire for traveling on rough terrain of the embodiment (hereinafter, also referred to as simply "tire") 1. FIG. 1 is a cross-sectional view of the tire 1 taken along a tire meridian including a tire rotation axis in a normal state. FIG. 2 is a development view of a tread portion 2 of the tire 1 illustrated in FIG. 1. FIG. 1 represents a cross-sectional view taken along a line A-A of FIG. 2.

The "normal state" refers to a state in which the tire is mounted on a normal rim (not illustrated) and inflated with a normal inner pressure under no-load. Unless otherwise specified, hereinafter, the dimensions and the like of components of the tire are measured in the normal state.

The term "normal rim" is a rim specified for each tire by standards in a standard system including the standards for the tire. For example, the normal rim is a "standard rim" under JATMA, a "design rim" under TRA, and a "measuring rim" under ETRTO.

The term "normal inner pressure" refers to a pneumatic pressure specified for each tire by standards in a standard system including the standards for the tire. The normal inner pressure is a "maximum pneumatic pressure" under JATMA, the maximum value described in the table "Tire Load Limits at Various Cold Inflation Pressures" under TRA, and an "inflation pressure" under ETRTO.

As illustrated in FIG. 1, the tire 1 of the embodiment includes a carcass 6 that extends from the tread portion 2 through sidewall portions 3 to bead cores 5 in bead portions 4, a belt layer 7 that is disposed outside the carcass 6 in the tire radial direction in the tread portion 2, and a bead apex rubber 8 that extends in a tapered manner from each bead core 5 outward in the tire radial direction.

The carcass 6 comprises two carcass plies 6A and 6B, for example. Each of the carcass plies 6A and 6B includes a main portion 6a extending from the tread portion 2 through the sidewall portions 3 to the bead cores 5 disposed in the bead portions 4, and turn-up portions 6b that connect to the main portion 6a and are turned up around the bead cores 5.

The carcass plies 6A and 6B comprise carcass cords arranged and inclined with respect to a tire equator C. The carcass cords cross each other between the carcass plies 6A and 6B. The carcass plies 6A and 6B of the embodiment have a radial structure in which the carcass cords are arranged at an angle of 65 to 90 degrees with respect to the tire equator C. The carcass plies 6A and 6B may have a bias structure in which the carcass cords are arranged at an angle of 15 to 45 degrees with respect to the tire equator C.

The carcass cords are preferably organic fiber cords of nylon, polyester, or rayon, for example.

The belt layer 7 is composed of one belt ply 7A, for example. The belt ply 7A has belt cords arranged and inclined with respect to the tire equator C. The belt cords are preferably formed from aramid, rayon, or the like, for example.

The bead apex rubber 8 is made of a hard rubber composition. The bead apex rubber 8 is interposed between the main portion 6a and one of the turn-up portions 6b. The bead apex rubber 8 reinforces the bead portions 4 and the sidewall portions 3.

The tread portion 2 includes an outer surface 2s curving in a convex arc shape outward in the tire radial direction between tread edges Te and Te. Accordingly, the tread portion 2 obtains a sufficient ground contact area even during cornering at a large camber angle. The tread width TW between the tread edges Te and Te in the axial direction of the tire is set to the tire maximum width.

As illustrated in FIG. 2, the tread portion 2 of the embodiment has a specified rotational direction R. The rotational direction R is indicated by a character or a mark on the sidewall portions or the like, for example.

The tread portion 2 includes blocks 10. The blocks 10 protrude radially outwardly from a groove bottom surface 9d of a tread groove 9. The blocks 10 are provided in a plurality of places with a space L1 therebetween in the circumferential direction of the tire. The groove bottom surface 9d is a bottom portion of the tread groove 9 that extends smoothly along the outer surface of the carcass 6.

The space L1 between the blocks 10 and 10 adjacent in the circumferential direction of the tire is preferably 2.0% or more, more preferably 2.5% or more, and preferably 3.0% or less, more preferably 2.8% or less of a circumferential length CL of the tire 1 on the tire equator C. This allows the blocks 10 to bite easily into the road surface and improves the grip performance in sand areas in particular.

The rubber hardness of the blocks 10 is preferably 55 degrees or more, more preferably 65 degrees or more, and is preferably 95 degrees or less, more preferably 85 degrees or less. When the rubber hardness of the blocks 10 is smaller than 55 degrees, the blocks 10 may not maintain sufficient rigidity or obtain sufficient grip. In contrast, when the rubber rigidity of the blocks is larger than 95 degrees, the flexibility of the blocks 10 may become lower to deteriorate the durability performance of the blocks. The rubber hardness herein complies with JIS-K6253 and refers to a durometer type A hardness at 23 deg. C.

The blocks 10 of the embodiment include center blocks 11 formed on the tire equator C, shoulder blocks 12 closest to the tread edge Te sides, and middle blocks 13 between the center blocks 11 and the shoulder blocks 12.

Each of the center blocks 11 includes a first portion 18 and a second portion 19, for example. The first portion 18 has a landscape rectangular shape elongated in the axial direction of the tire. The first portion 18 is convex-curved to the side opposite to the rotational direction R of the tire 1. The second portion 19 protrudes from the first portion 18 to the both ends in the circumferential direction of the tire on the tire equator C. With the first portion 18 and the second portion 19, the tread surface of the center block 11 is formed in an almost cross shape. The center blocks 11 improve effectively the traction performance of the tire.

A width W1 of the first portion 18 in the circumferential direction of the tire is preferably 0.10 times or more, more preferably 0.15 times or more, and preferably 0.30 times or less, more preferably 0.25 times or less longer than the space L1. This allows the blocks 10 to bite effectively into the road surface thereby achieving further improved grip.

Each of the shoulder blocks 12 includes end edges 12e and 12e extending in the circumferential direction of the tire and is formed in an almost trapezoidal shape, for example. The circumferential length W2 of the shoulder blocks 12 increases gradually outward in the axial direction of the tire. The shoulder blocks 12 improve the stable driving performance during cornering.

Each of the middle blocks 13 includes end edges 13e and 13e extending in the circumferential direction of the tire and is formed in an almost trapezoidal shape. Each of the middle blocks 13 includes an inner portion 13a and an outer portion 13b. A width W3 of the inner portion 13a is kept constant. A width W3 of the outer portion 13b increases gradually outward in the axial direction of the tire.

The land-sea ratio of the tire 1 in the embodiment is 10 to 20%, preferably 13 to 18%, for example. The land-sea ratio herein refers to the ratio of the total area of tread surfaces 10s of the blocks 10 to the entire area of the outer surface of the tread portion 2 based on the assumption that the entire tread grooves 9 is filled up.

Recess portions 15 are provided on the groove bottom surface 9d between a pair of adjacent blocks 10 and 10 in the circumferential direction of the tire. In the embodiment, the recess portions 15 are provided in a tread central area where the center blocks 11 and the middle blocks 13 are formed. The recess portions 15 are arranged in the axial direction of the tire with a space therebetween. In a preferred embodiment, the recess portions 15 are arranged at equal spaces therebetween in the axial direction of the tire. These recess portions 15 do not decrease excessively rigidity of the groove bottom surface 9d between adjacent blocks 10 and 10 in the circumferential direction of the tire but can moderate it evenly, as compared to the case where only one large recess portion is provided. Accordingly, it is possible to alleviate effectively the concentration of stress on the basal portions of the blocks 10 when the blocks 10 are in contact with the ground.

Although there is no particular limitation, number N1 of the recess portions 15 provided in the axial direction of the tire is preferably six or more, more preferably seven or more, and is preferably ten or less, more preferably nine or less. When the number N1 is smaller than six, the rigidity of the groove bottom surface 9d may not be evenly moderated. In contrast, when the number N1 is larger than ten, the rigidity of the groove bottom surface 9d may decrease excessively.

A spew sucked up by a vent hole in a mold during vulcanization molding or its excision mark 17 is provided between one of the recess portion 15 and one of the block 10 in the circumferential direction of the tire. The tire 1 makes it possible to suppress a residual gas prone to be generated between the block 10 and the recess portion 15 when the recess portions 15 and the blocks 10 are vulcanized and molded in the tread portion 2. Accordingly, it is possible to suppress the molding failure of the basal portions of the blocks 10 and suppress the occurrence of cracks causing the deterioration in durability performance of the blocks 10, between the block 10 and the recess portion 15.

In the embodiment, the recess portions 15 have edges 15e formed in an elongated circular shape including vertical edges 20 and 20 extending in the circumferential direction of the tire and arc portions 21. The vertical edges 20 and 20 in a pair extend linearly in parallel to each other in the circumferential direction of the tire, for example. The arc portions 21 connect the vertical edges 20 and 20 in an arc shape. Such a recess portion 15 can suppress the occurrence of cracks from the edges 15e.

An axial length L2 of the recess portions 15 is preferably 0.10 times or more, more preferably 0.12 times or more, and preferably 0.16 times or less, more preferably 0.14 times or less longer than a tread development width TWe. When the tire axial length L2 of the recess portions 15 is shorter than 0.10 times the tread development width TWe, the foregoing advantages may become lessened. In contrast, when the length L2 is longer than 0.16 times the tread development width TWe, the rigidity of the groove bottom surface 9d may become locally lower.

A circumferential length L3 of the recess portions 15 is desirably longer than the tire axial length L2. With the vertically long shaped recess portions 15, the tread portion 2 has the rigidity in the circumferential direction of the tire higher than the rigidity in the axial direction of the tire, thereby improving the traction performance during straight-ahead driving.

To produce fully the foregoing advantages, the ratio L3/L2 of the tire circumferential length L3 of the recess portions 15 to the tire axial length L2 of the recess portions 15 is preferably 3.0 or more, more preferably 3.4 or more. When the ratio L3/L2 is large, the rigidity of the tread portion 2 in the axial direction of the tire may become lower to cause deterioration in the stable driving performance when the vehicle body tilts during cornering. Accordingly, the ratio L3/L2 is preferably 4.2 or less, more preferably 3.8 or less.

Figure 3:
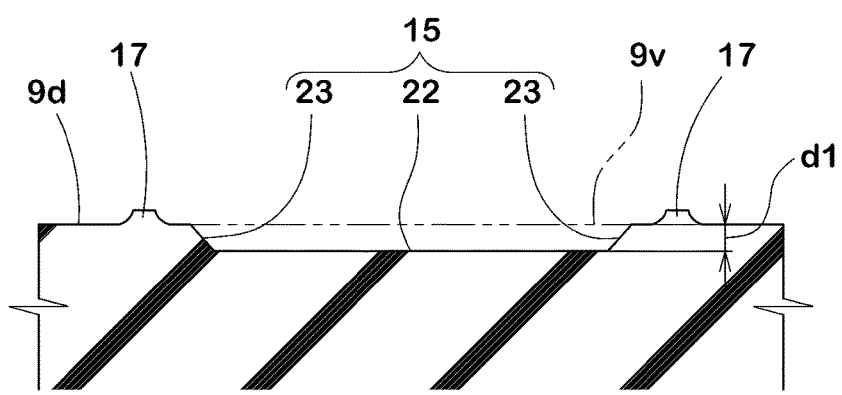
FIG. 3 is a cross-sectional view taken along a line B-B of FIG. 2.

FIG. 3 is a cross-sectional view taken along a line B-B of FIG. 2. As illustrated in FIG. 3, each of the recess portions 15 includes a bottom portion 22 and a sidewall portion 23. The bottom portion 22 extends along a virtual surface 9v extended from the groove bottom surface 9d more inward in the tire radial direction than the virtual surface 9v. The sidewall portions 23 connect the groove bottom surface 9d and the bottom portion 22.

A depth d1 of the recess portions 15 is preferably 0.5 mm or more, more preferably 0.8 mm or more, and is preferably 1.5 mm or less, more preferably 1.2 mm or less. When the depth d1 of the recess portions 15 is smaller than 0.5 mm, the foregoing advantages may be lessened. On the other hand, when the depth d1 of the recess portions 15 is larger than 1.5 mm, the rigidity of the groove bottom surface 9d of the tread portion 2 may become lower to deteriorate the stable driving performance.

As illustrated in FIG. 2, an axial distance W4 between axially adjacent recess portions 15 and 15 is preferably 1.10 times or more, more preferably 1.20 times or more, and preferably 1.35 times or less, more preferably 1.30 times or less larger than the tire axial length L2 of the recess portions 15. When the distance W4 is smaller than 1.10 times the length L2, the rigidity of the groove bottom surface 9d between blocks 10 and 10 may become excessively lower. On the other hand, when the distance W4 is larger than 1.35 times the length L2, the concentration of stress on the basal portions of the blocks 10 may not be alleviated.

Next, a tire vulcanization mold capable of molding the motorcycle tire for traveling on rough terrain as described above will be explained with reference to the drawings.

Figure 4:
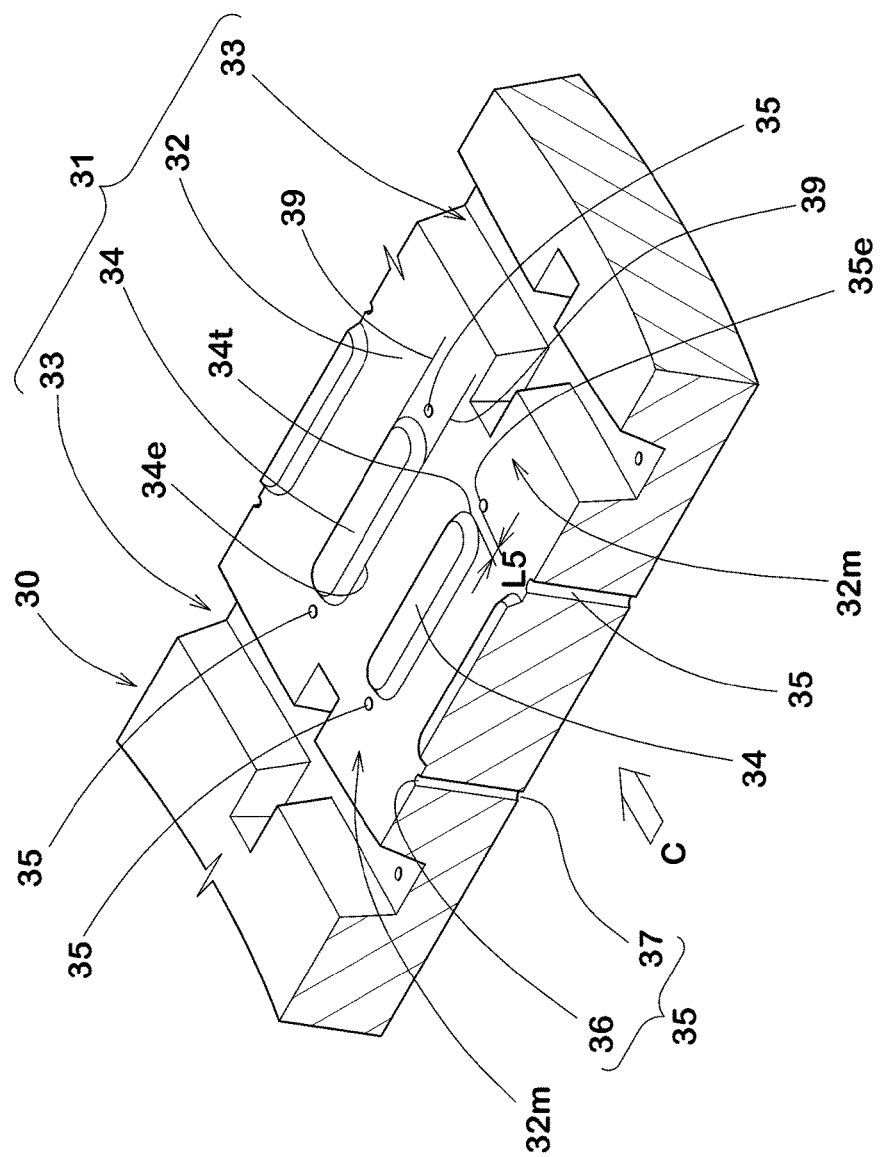
FIG. 4 is a partial perspective view of a tire vulcanization mold for molding the tire of the present invention.

FIG. 4 is a partial perspective view of a tire vulcanization mold 30. The tire vulcanization mold 30 includes a tread molding surface 31 for molding the tread portion 2 of the tire 1 of the present invention illustrated in FIG. 1. For example, a range a1 of the tread portion 2 illustrated in FIG. 2 is molded by the tread molding surface 31 illustrated in FIG. 4.

As illustrated in FIG. 4, the tread molding surface 31 includes a first portion 32 for molding the groove bottom surface 9d (illustrated in FIG. 2), a plurality of second portions 33 for molding the blocks 10 (illustrated in FIG. 2), and a plurality of projecting third portions 34 for molding the recess portions 15 (illustrated in FIG. 2).

The third portions 34 are provided between second portions 33 and 33 adjacent in the circumferential direction of the tire. The third portions 34 are configured as a vertically long shape having a length in the circumferential direction of the tire greater than a length in the axial direction of the tire. The recess portions 15 (illustrated in FIG. 2) recessed from the groove bottom surface 9d are molded by the third portions 34.

The third portions 34 are arranged in the axial direction of the tire with a space therebetween. The number N2 of the third portions 34 provided in the axial direction of the tire is the same as the number of the recess portions 15. That is, the number N2 of the third portions 34 is preferably six or more, more preferably seven or more, and is preferably ten or less, more preferably nine or less.

A vent hole 35 is provided in a first portion 32m between one of the second portions 33 and one of the third portions 34. The vent hole 35 includes one end 36 opened on the tread molding surface 31. The other end 37 of the vent hole 35 communicates with the outside of the mold and is connected to a vacuum device not illustrated. The vent hole 35 can eject the air between the mold and the raw cover to the outside of the mold.

Figure 5:
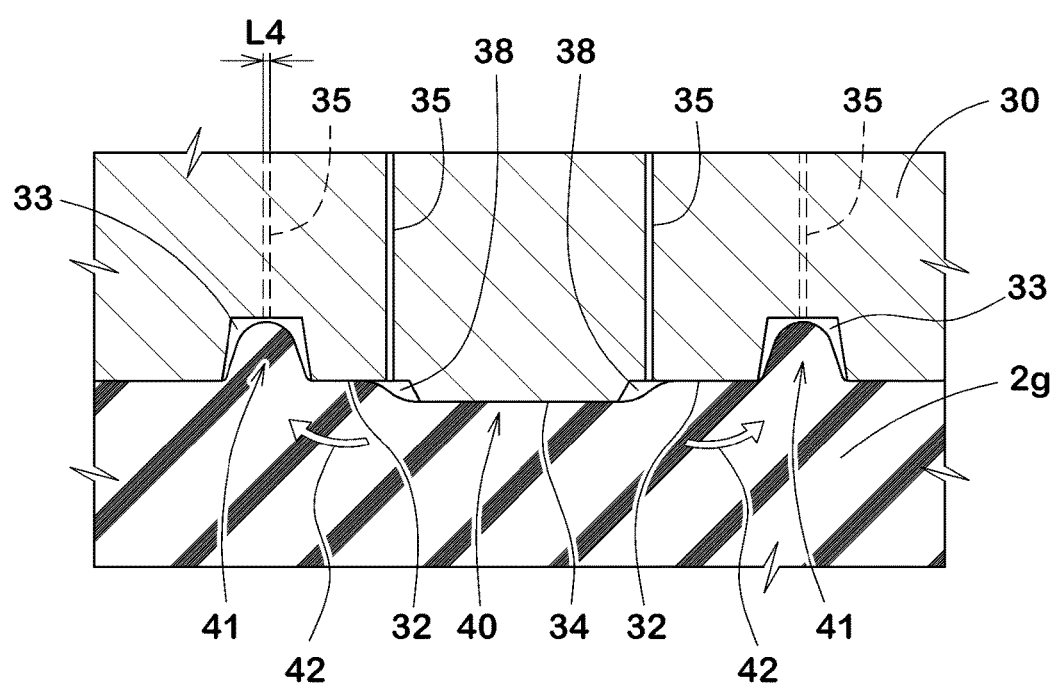
FIG. 5 is an illustrative view for describing vulcanization molding.

FIG. 5 is a cross-sectional view of the tire vulcanization mold 30 illustrated in FIG. 4 seen from C direction. As illustrated in FIG. 5, at the time of vulcanization molding, the tire vulcanization mold 30 is brought into intimate contact with tread rubber 2g. At that time, the tread rubber 2g forms press portions 40 pressed by the first portion 32 and the third portions 34 and suction portions 41 sucked by the second portions 33, and moves in the directions of arrows 42. The rubber needs to move largely in particular for the motorcycle tire for traveling on rough terrain with the large-area groove bottom surface 9d and the high blocks 10 (illustrated in FIG. 1) as in the present invention. Accordingly, when there are no vent holes 35 between the second portions 33 and the third portions 34, air gaps 38 are generated due to the movement failure of the rubber to cause fine vulcanization molding defects at the basal portions of the blocks 10. However, the tire vulcanization mold 30 of the present invention includes the vent holes 35 between the second portions 33 and the third portions to suppress the occurrence of the air gaps 38. Accordingly, it is possible to suppress the vulcanization molding defects at the basal portions of the blocks 10 and improve the durability of the blocks 10.

To produce effectively the foregoing advantages, a hole diameter L4 of the vent holes 35 is preferably 0.5 mm or more, more preferably 0.8 mm or more, and is preferably 1.5 mm or less, more preferably 1.2 mm or less.

As illustrated in FIG. 4, when a circumferential distance L5 between an edge 35e of the vent hole 35 and an edge 34t of the third portion 34 is large, the gas may be likely to remain. Accordingly, the distance L5 is preferably 6.0 mm or less, more preferably 4.0 mm or less. On the other hand, when the distance L5 is small, spews may be formed near the end edges of the recess portions to deteriorate the external appearance of the tire. Accordingly, the distance L5 is preferably 1.0 mm or more, more preferably 3.0 mm or more.

The vent holes 35 are desirably provided between extension lines 39 and 39 extending in the circumferential direction of the tire from the both end edges 34e and 34e of the third portion 34. The vent holes 35 suppress effectively the residual gas.

The particularly preferred embodiment of the present invention has been described in detail so far. However, the present invention is not limited to the illustrated embodiment but can be modified in various manners.

EXAMPLES

A motorcycle pneumatic tire for traveling on rough terrain having the basic structure illustrated in FIG. 1 and having the basic tread pattern illustrated in FIG. 2 was prototyped in accordance with the specifications in Table 1. As a comparative example 1, a tire without recess portions in the groove bottom surface was prototyped. As comparative examples 2 to 5, tires with recess portions in the groove bottom surface and without spews or their excision marks between the recess portions and the blocks were prototyped. These prototyped tires were mounted on rear wheels of a test vehicle and were tested for performance. The common specifications and test method for the test tires were as follows.

Used motorcycle: Motorcycle with a displacement of 450 cc

Tire size: 110/90-19

Rim size: 2.50×19

Inner pressure: 80 kPa

Steering Stability Performance:

Under the foregoing conditions, the test tires were tested for steering stability performance by sensory evaluation of a rider operating the motorcycle in a test course on an rough terrain road surface. The larger values of test results are better with a score of 100 representing the values of the comparative example 1.

Block Durability Performance:

After the three-hour driving on the rough terrain road surface, the number of cracks generated in the blocks was measured. The values of test results are expressed as the reciprocals of the numbers of the generated cracks with a score of 100 representing the value of the comparative example 1. The larger values of test results indicate more excellence in block durability performance. Table 1 shows the test results.

TABLE 1

|  | Ref. 1 | Ref. 2 | Ref. 3 | Ref. 4 | Ref. 5 | Ex. 1 | Ex. 2 | Ex. 3 | Ex. 4 | Ex. 5 |
|---|---|---|---|---|---|---|---|---|---|---|
| Land-sea ratio (%) | 16.0 | 16.0 | 16.0 | 24.0 | 16.0 | 16.0 | 16.0 | 16.0 | 16.0 | 16.0 |
| Block space L1/circumferential length CL (%) | 2.8 | 2.8 | 2.8 | 14.0 | 2.1 | 2.8 | 2.8 | 2.8 | 2.8 | 5.0 |
| Number N1 of recess portions (unit) | — | 8 | 5 | 1 | 1 | 8 | 8 | 8 | 8 | 12 |
| Depth d1 of recess portions (mm) | — | 1.0 | 1.0 | 1.0 | 1.0 | 1.0 | 1.0 | 1.0 | 1.0 | 1.0 |
| Tire circumferential length L3 of recess portions/axial length L2 of recess portions | — | 4.0 | 4.0 | 1.0 | 0.2 | 4.0 | 4.0 | 4.0 | 4.0 | 6.0 |
| Hole diameter L4 of vent hole (mm) | — | — | — | — | — | 0.8 | 2.0 | 0.5 | 1.5 | 0.8 |
| Distance L5 between vent hole and third portion (mm) | — | — | — | — | — | 2.5 | 2.5 | 2.5 | 2.5 | 2.5 |
| Steering stability performance (score) | 100 | 103 | 100 | 95 | 102 | 110 | 108 | 110 | 113 | 109 |
| Block durability performance (index) | 100 | 102 | 101 | 100 | 101 | 112 | 110 | 111 | 109 | 109 |

As a result, it has been revealed that the tires of the example improved in the durability performance of the blocks.

The invention claimed is:

1. A motorcycle tire for traveling on rough terrain, the tire comprising:
    a tread portion being provided with a plurality of blocks protruding radially outwardly from a groove bottom surface and arranged in a circumferential direction of the tire with a space therebetween;
    a plurality of recess portions being provided on the groove bottom surface between a pair of circumferentially adjacent blocks, the recess portions arranged in an axial direction of the tire with a space therebetween, wherein six to ten recess portions are arranged in the axial direction of the tire; and
    a spew sucked up a vent hole in a mold during vulcanization molding or its excision mark being provided between each recess portion and the block adjacent to the recess portion in the circumferential direction of the tire.

2. The motorcycle tire for traveling on rough terrain according to claim 1, wherein the recess portions are configured as a vertically long shape having a length in the circumferential direction of the tire greater than a length in the axial direction of the tire.

3. A tire vulcanization mold comprising a tread molding surface for molding a tread portion of a motorcycle tire for traveling on rough terrain comprising a plurality of blocks protruding radially outwardly from a groove bottom surface and arranged in a circumferential direction of the tire with a space therebetween, the mold comprising:
    the tread molding surface comprising a first portion for molding the groove bottom surface, a plurality of second portions for molding the blocks, and a plurality of projecting third portions provided between a pair of adjacent second portions in the circumferential direction of the tire for molding recess portions on the groove bottom surface, wherein six to ten third portions are provided in the axial direction of the tire;
    the third portions being arranged in an axial direction of the tire with a space therebetween; and
    the first portion between one of the second portions and one of the third portions being provided with one end of a vent hole having the other end communicating with the outside of the mold to discharge an air to an outside of the mold during vulcanization.

4. The tire vulcanization mold according to claim 3, wherein the third portions are configured as a vertically long shape having a length in the circumferential direction of the tire greater than a length in the axial direction of the tire.

5. The tire vulcanization mold according to claim 3, wherein a hole diameter of the vent hole is in a range of from 0.5 to 1.5 mm.

6. The tire vulcanization mold according to claim 3, wherein a circumferential distance between an edge of the one end of the vent hole and an edge of the third portion is in a range of from 1 to 6 mm.

7. A motorcycle tire for traveling on rough terrain, the tire comprising:
    a tread portion being provided with a plurality of blocks protruding radially outwardly from a groove bottom surface to a ground contact surface and arranged in a circumferential direction of the tire with a space therebetween;
    a plurality of recess portions being provided on the groove bottom surface between a pair of circumferentially adjacent blocks, the recess portions being recessed radially inwardly from the groove bottom surface and arranged in an axial direction of the tire with a space therebetween; and
    a spew sucked up a vent hole in a mold during vulcanization molding or its excision mark being provided between each recess portion and the block adjacent to the recess portion in the circumferential direction of the tire.

8. The motorcycle tire for traveling on rough terrain according to claim 7, wherein the recess portions are configured as a vertically long shape having a length in the circumferential direction of the tire greater than a length in the axial direction of the tire.

9. The motorcycle tire for traveling on rough terrain according to claim 8, wherein in each of the recess portions, a ratio L3/L2 of a tire circumferential length L3 of the recess portion to a tire axial length L2 of the recess portion is in a range of from 3.0 to 4.2.

10. A tire vulcanization mold comprising a tread molding surface for molding a tread portion of a motorcycle tire for traveling on rough terrain comprising a plurality of blocks protruding radially outwardly from a groove bottom surface to a ground contact surface and arranged in a circumferential direction of the tire with a space therebetween, the mold comprising:
    the tread molding surface comprising a first portion for molding the groove bottom surface, a plurality of second portions for molding the blocks, and a plurality of projecting third portions provided between a pair of adjacent second portions in the circumferential direction of the tire for molding recess portions on the groove bottom surface;
    the third portions protruding radially outwardly from the first portion and being arranged in an axial direction of the tire with a space therebetween; and the first portion between one of the second portions and one of the third portions being provided with one end of a vent hole having the other end communicating with the outside of the mold to discharge an air to an outside of the mold during vulcanization.

11. The tire vulcanization mold according to claim 10, wherein the third portions are configured as a vertically long shape having a length in the circumferential direction of the tire greater than a length in the axial direction of the tire.

12. The tire vulcanization mold according to claim 10, wherein a hole diameter of the vent hole is in a range of from 0.5 to 1.5 mm.

13. The tire vulcanization mold according to claim 10, wherein a circumferential distance between an edge of the one end of the vent hole and an edge of the third portion is in a range of from 1 to 6 mm.

* * * * *